Feb. 2, 1926.
E. J. WELFFENS
1,571,219
SWING GEARING FOR SLUBBING, ROVING, AND LIKE FRAMES
Filed May 26, 1925     2 Sheets-Sheet 1
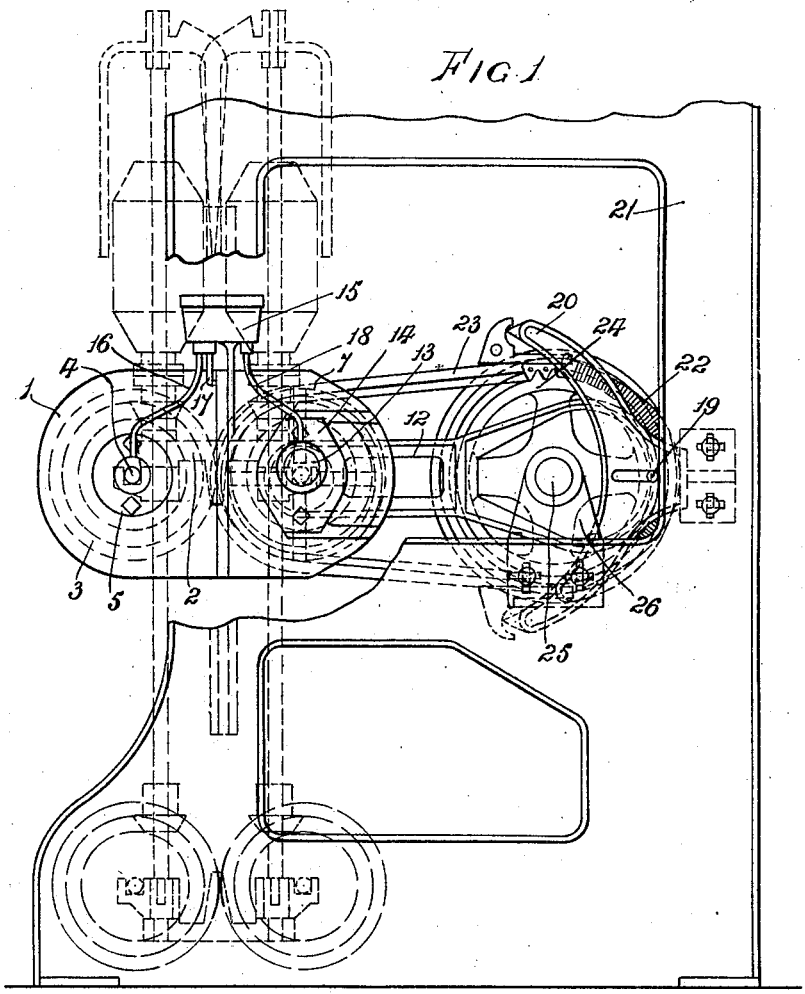
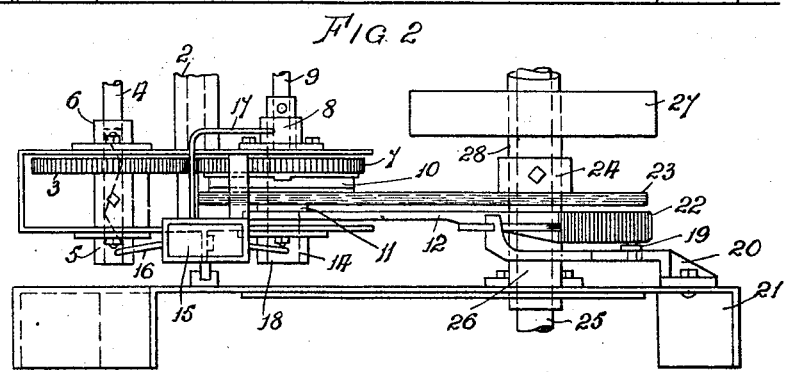
INVENTOR:
Emile John Welffens.
BY Reege, Boyer & Bakelev
ATTORNEYS.

Feb. 2, 1926.                                          1,571,219
E. J. WELFFENS
SWING GEARING FOR SLUBBING, ROVING, AND LIKE FRAMES
Filed May 26, 1925          2 Sheets-Sheet 2
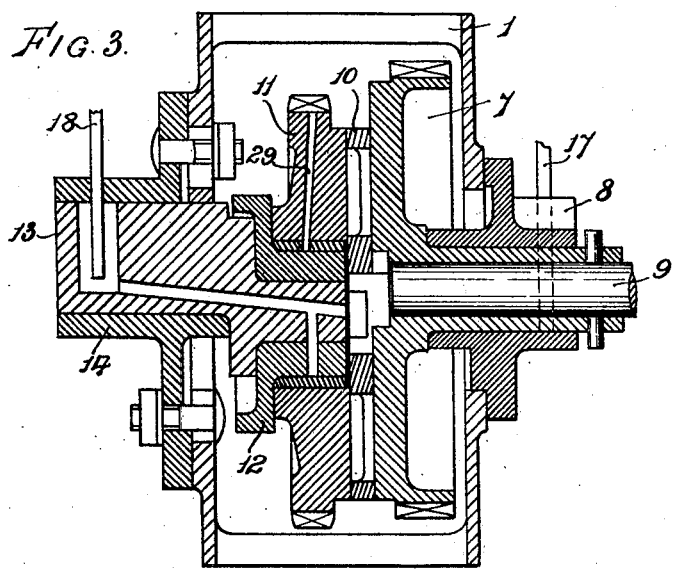
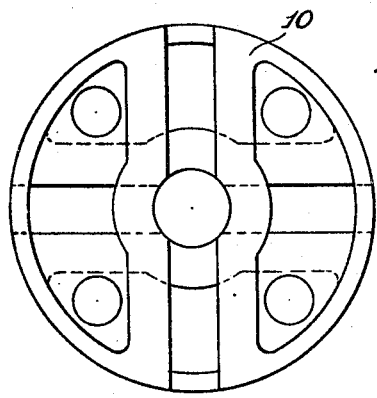
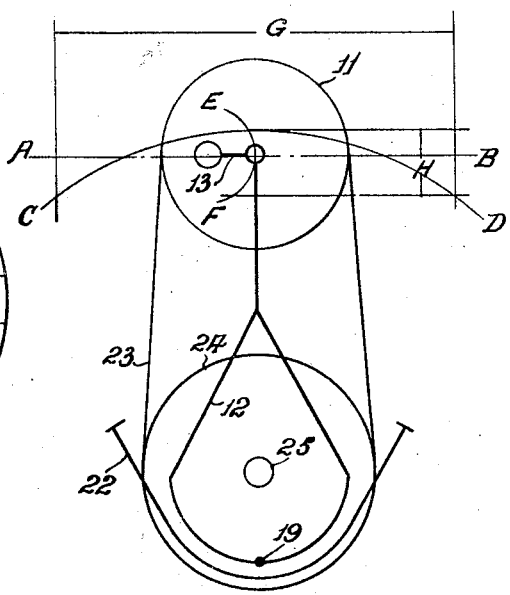
INVENTOR:
Emile John Welffens
BY: Reege, Boyer Bakelan
ATTORNEYS.

Patented Feb. 2, 1926.

1,571,219

UNITED STATES PATENT OFFICE.

EMILE JOHN WELFFENS, OF MANCHESTER, ENGLAND.

SWING GEARING FOR SLUBBING, ROVING, AND LIKE FRAMES.

Application filed May 26, 1925. Serial No. 32,386.

*To all whom it may concern:*

Be it known that I, EMILE JOHN WELFFENS, a subject of the King of the Belgians, residing at Longsight, Manchester, in the county of Lancaster, England, have invented new and useful Improvements in Swing Gearing for Slubbing, Roving, and like Frames, of which the following is a specification.

The invention relates to swing gearing for slubbing, roving and like frames in which the swing comprises an Oldham's coupling as described in Patent No. 1,391,290 and automatic lubrication as described in Patent No. 1,491,366.

It aims at providing a crank for supporting a thrust arm and capable of oscillating with that thrust arm, the oscillations resulting from the alternate vertical translation of the bobbin rail and from the concomitant variation in centre distance between the driving shaft, stationary in position, and the back bobbin shaft, carried by the bobbin rail.

The invention is described with reference to the accompanying drawings.

Fig. 1 shows the gearing in elevation and Fig. 2 is a plan view of the arrangement;

Fig. 3 is a section through the arrangement along the axis of the back bobbin shaft;

Fig. 4 shows the coupling plate and

Fig. 5 is a diagram illustrating the movement of the various parts.

In Figs. 1 and 2 numeral 1 designates the rail box, fixed to bobbin rail 2. Spur wheel 3 is fixed to front bobbin shaft 4 rotating in bearings 5 and 6 fixed to rail box 1. Spur wheel 7 meshes with wheel 3, rotates in bearing 8 and is dowelled to back bobbin shaft 9. Slots in coupling plate 10, machined at 90° (see Fig. 4) engage cleat-like projections on spur wheel 7 and on driven chain wheel 11 and so connect wheels 3, 7 and 11 for rotation. Chain wheel 11 rotates on the boss of thrust arm 12 (see Fig. 3), a hole in this boss fits the pin of crank 13, the shaft of which swivels in bearing 14 fixed to rail box 1. A triple feed lubricator 15, fixed to rail box 1, conducts, by means of pipes 16, 17 and 18, lubricant to bearings 5 and 8 and, through bearing 14, to the oscillating crank 13 (see Fig. 3). Shaft 4 has a coarse spiral groove for conducting lubricant from bearing 5 to bearing 6. Thrust arm 12 has an adjustable stud 19 resting and sliding in a slot in spring bracket 20. This bracket is fixed to gearing end 21 and carries spring 22 which engages thrust arm 12 as shown. The spring tension pushes 12 forward and thereby tensions chain 23 around driving wheel 24 and driven wheel 11. Driving shaft 25 runs in bearing 26 and carries differential 27, driving wheel 24 being fixed to the differentially driven member 28.

In Fig. 3, a sectional assembly view along the axis of the back bobbin shaft, numeral 1 again designates the rail box to which bearing 8 and 14 are fixed. Crank 13 supports arm 12 and is holed so that the lubricant from pipe 18 may lubricate wheel 11, the Oldham's coupling and, through a hole 29 in wheel 11, the chain and the teeth of the chain wheels.

Fig. 4 shows the construction and slotting of coupling plate 10.

Fig. 5 is a diagram illustrating the movements of the various parts during operation. Line A. B. represents the path along which the axes of shaft 9 and of wheel 7 move, with a motion of alternate vertical translation, G being the lift or extent of travel. Line C. D. represents the curved path followed by the axes of the pin on crank 13 and of wheel 11 because chain 23 remains taut in all positions and thereby keeps the distance between the axes of wheels 11 and 24 substantially constant.

The axis of the crank pin lies on curve C. D. consequently crank 13 will oscillate along curve E. F. twice during every rise and fall of rail 2, H. being the magnitude of oscillation.

As shown in Fig. 3, crank 13 supports wheel 11 and arm 12, it keeps them in position in rail box 1, it allows them to move so that the centre distance of the chain drive is kept substantially constant, and its use secures a simple and easily assembled arrangement.

The Oldham's coupling-like arrangement consisting of plate 10 and the cleats on wheels 7 and 11 couples wheels 7 and 11 for rotation and secures the same angular velocity in both wheels, while their axes follow different paths as illustrated, in order to keep both sides of chain 23 taut and spring-loaded in all positions.

Spring-loading avoids rigidity, it reduces vibration and wear in the chain drive materially and greatly increases smoothness of operation. Keeping the centre distance of the chain drive constant avoids undue sag in the slack side of the chain, this again reduces wear and, by preventing whipping in the chain, it avoids the end stretch and the end breakage caused by chain whip.

Instead of a spring-loaded thrust arm, a rigid thrust arm might be used with crank 13, such a thrust arm swivelling around driving shaft 25 or around a bearing concentric with that shaft.

What I claim as my invention and desire to secure by Letters Patent is:—

1. In swing gearing for slubbing, roving and like frames, the combination of a rail box, a crank shaft mounted for rotation therein, a thrust arm provided with a boss, a crank carried by said shaft and having a crank pin passing through said boss thereby to support the thrust arm, a wheel mounted for rotation on the thrust arm, and a coupling member mounted for rotation independently of said wheel, said crank being provided with passages therethrough for conducting lubricant from the crank shaft bearing to said wheel and coupling member.

2. In swing gearing for slubbing, roving and like frames, the combination of a rail box, a crank shaft mounted for rotation therein, a thrust arm provided with a boss, a crank carried by said shaft and having a crank pin passing through said boss thereby to support the thrust arm, a wheel mounted for rotation on the thrust arm, a coupling member mounted for rotation independently of said wheel, said crank being provided with passages therethrough for conducting lubricant from the crank shaft bearing to said wheel and a coupling member, and said wheel having a passage therethrough for conducting lubricant from the wheel bearing to the periphery of said wheel.

In testimony whereof I have signed my name to this specification.

EMILE JOHN WELFFENS.